US010933487B2

(12) United States Patent
Lee et al.

(10) Patent No.: US 10,933,487 B2
(45) Date of Patent: Mar. 2, 2021

(54) SPOT WELDING APPARATUS

(71) Applicant: HYUNDAI MOTOR COMPANY, Seoul (KR)

(72) Inventors: So Young Lee, Uiwang-si (KR); Sung Phil Ryu, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 614 days.

(21) Appl. No.: 15/816,359

(22) Filed: Nov. 17, 2017

(65) Prior Publication Data
US 2018/0071855 A1 Mar. 15, 2018

Related U.S. Application Data

(62) Division of application No. 14/556,289, filed on Dec. 1, 2014, now Pat. No. 9,849,540.

(30) Foreign Application Priority Data

Jul. 28, 2014 (KR) .................. 10-2014-0095819

(51) Int. Cl.
*B23K 11/11* (2006.01)
*B23K 11/31* (2006.01)
*B23K 11/30* (2006.01)

(52) U.S. Cl.
CPC ......... *B23K 11/115* (2013.01); *B23K 11/3072* (2013.01); *B23K 11/312* (2013.01); *B23K 11/315* (2013.01)

(58) Field of Classification Search
CPC . B23K 11/312; B23K 11/315; B23K 11/3072; B23K 11/115
(Continued)

(56) References Cited

U.S. PATENT DOCUMENTS 4,684,778 A * 8/1987 Cecil .................... B23K 11/317
219/116
5,412,172 A * 5/1995 Ichikawa .............. B23K 11/115
219/86.41
(Continued)

FOREIGN PATENT DOCUMENTS

CN 101961815 A 2/2011
CN 102950371 A 3/2013
(Continued)

*Primary Examiner* — Dana Ross
*Assistant Examiner* — Kuangyue Chen
(74) *Attorney, Agent, or Firm* — Morgan, Lewis & Bockius LLP

(57) ABSTRACT

A spot welding apparatus includes a stationary frame having a housing formed therein. An upper welding gun is mounted to a length direction of a pressing unit disposed in the housing of the stationary frame. A plurality of lower welding guns are mounted on an outside of the stationary frame and ends of the plurality of lower welding guns selectively face one end of the upper welding gun in a length direction of the lower welding guns by the plurality of lower welding guns. A plurality of actuators are mounted on the outside of the stationary frame. A plurality of link units are disposed between the actuators and the lower welding guns, connect the actuators and the lower welding guns, respectively, and rotate as the actuators are operated.

8 Claims, 11 Drawing Sheets

(58) Field of Classification Search
USPC .................................................. 219/125.1
See application file for complete search history.

(56) References Cited

U.S. PATENT DOCUMENTS

| | | | |
|---|---|---|---|
| 5,628,923 A | 5/1997 | Nishiwaki | |
| 5,789,719 A | 8/1998 | Pary et al. | |
| 5,818,007 A | 10/1998 | Itatsu | |
| 6,313,427 B1 | 11/2001 | Suita | |
| 6,337,456 B1 | 1/2002 | Taniguchi et al. | |
| 6,429,397 B1 | 8/2002 | Sun et al. | |
| 8,312,611 B2 | 11/2012 | Tobita et al. | |
| 2002/0011470 A1 | 1/2002 | Domschot | |
| 2003/0038118 A1 | 2/2003 | Sun et al. | |
| 2003/0094441 A1* | 5/2003 | Dugas | B23K 11/315 219/90 |
| 2004/0050827 A1 | 3/2004 | Aktas | |
| 2007/0175868 A1 | 8/2007 | Christensen et al. | |
| 2011/0017710 A1* | 1/2011 | Yasunaga | B23K 11/115 219/87 |
| 2012/0067851 A1 | 3/2012 | Lee | |
| 2013/0037528 A1 | 2/2013 | Ogake | |
| 2015/0090699 A1* | 4/2015 | Lee | B23K 11/115 219/86.8 |
| 2015/0102018 A1* | 4/2015 | Lee | B23K 11/312 219/86.7 |
| 2015/0183049 A1* | 7/2015 | Lee | B23K 11/314 219/86.33 |
| 2016/0023294 A1* | 1/2016 | Lee | B23K 11/312 219/125.1 |
| 2016/0221113 A1* | 8/2016 | Miwa | B23K 11/115 |
| 2017/0036296 A1* | 2/2017 | Fukui | B23K 11/115 |
| 2017/0297138 A1* | 10/2017 | Sigler | B23K 11/3009 |

FOREIGN PATENT DOCUMENTS

| | | |
|---|---|---|
| EP | 1221351 A1 | 7/2002 |
| JP | H11-170064 A | 6/1999 |
| KR | 2003-0005837 A | 1/2003 |
| KR | 10-2011-0025339 A | 3/2011 |
| KR | 10-1107611 B1 | 1/2012 |
| KR | 10-2014-0086694 A | 7/2014 |

* cited by examiner

SPOT WELDING APPARATUS

CROSS-REFERENCE TO RELATED APPLICATION

The present application is a Divisional of U.S. patent application Ser. No. 14/556,289, filed Dec. 1, 2014, which claims the benefit of priority to the Korean Patent Application Number 10-2014-0095819 filed on Jul. 28, 2014, the entire contents of which application are incorporated herein for all purposes by this reference.

TECHNICAL FIELD

The present disclosure relates to a spot welding apparatus. More particularly, the present disclosure relates to a spot welding apparatus for selecting a lower welding gun to accommodate a welding point of a welding object.

BACKGROUND

In general, a vehicle manufacturing process combines various structural components, including a welding process of pressed formed vehicle body panels, and finishing process of painting a surface of the vehicle body.

Then, in a fitting process, power train system components and components of systems, such as a suspension system, a steering system, a braking system are assembled, and then, doors, a trunk lid, a hood, and so on are assembled.

In combining vehicle body components, such as a roof, pillars, side panels, flanges for opening of the doors, and so on in a vehicle body assembly process, resistance spot welding is used for combining two vehicle body panels by using a spot welding apparatus.

In the resistance spot welding, the two vehicle body panels are welded by electrical resistance while applying a pressure to surfaces of the two vehicle body panels, in general, by using the spot welding apparatus mounted to front ends of welding robot arms.

The spot welding apparatus has one set of spot welding unit with an X-type welding gun, a C-type welding gun, or a special type welding gun selectively applied thereto depending on whether a position of a welding portion interferes with the vehicle body or not mounted to the robot arms.

Consequently, the spot welding is carried out with a plurality of robots provided on a line, including a robot having the spot welding unit with the X-type welding gun applied thereto, a robot having the spot welding unit with the C-type welding gun applied thereto, and a robot having the spot welding unit with the special type welding gun applied thereto.

However, the related art spot welding has drawbacks in that much time period is required for carrying out the required number of welds, and productivity and efficiency are poor because one set of the spot welding unit is mounted to the robot arms of every one set of the robot, enabling to make one point of welding every moment the robot arm move.

Moreover, the related art spot welding requires a lower welding gun of shapes varied with positions and shapes of welding points to increase an equipment investment expenditure, and particularly, since the plurality of robots each having the spot welding unit with the lower welding gun of the special shape applied thereto is required, the related art welding has drawbacks in that equipment and maintenance cost increases, energy is used excessively, and an occupation ratio of the robots increases.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide spot welding apparatus having advantages of carrying out welding while making automatic selection of a lower welding gun to accommodate different welding points of a welding object. An aspect of the present disclosure provides a spot welding apparatus in which a plurality of lower welding guns are provided for carrying out welding while making automatic selection of the lower welding guns to accommodate different welding points of a welding object.

According to an exemplary embodiment of the present inventive concept, a spot welding apparatus may include a stationary frame having a housing formed therein, in which one end of the stationary frame in a length direction thereof is opened. An upper welding gun is mounted to one end of a pressing unit in a length direction of the pressing unit which is provided in the housing in the stationary frame to have a length direction of the upper welding gun parallel to the length direction of the stationary frame for reciprocating in the length direction of the stationary frame by the pressing unit. A plurality of lower welding guns are mounted to an outside of the stationary frame and ends of the plurality of lower welding guns selectively face one end of the upper welding gun in a length direction of the lower welding guns. A plurality of actuators are mounted to the outside of the stationary frame corresponding to the plurality of lower welding guns for rotating the lower welding guns, respectively. A plurality of link units are disposed between and connect the actuators and the lower welding guns, respectively, and rotate as the actuators are operated.

The pressing unit may include a drive motor provided at one side of the pressing unit in the length direction thereof. A screw shaft is connected to the drive motor to rotate therewith. A movable block is coupled to the screw shaft to reciprocate in a length direction of the screw shaft connected to the upper welding gun.

The lower welding guns may be a first lower welding gun including a first swing arm having one end with a first lower welding tip provided thereto. A second lower welding gun includes a second swing arm having one end with a second lower welding tip provided thereto.

The first swing arm has another end coupled to a first hinge point such that the first swing arm is rotatable on the first hinge point mounted to the stationary frame.

The second swing arm may have another end coupled to a second hinge point such that the second swing arm is rotatable on the second hinge point mounted to the stationary frame.

The first and second swing arms have shapes and sizes different from each other to accommodate different welding points.

The actuators may have a first actuator coupled to the stationary frame with a third hinge point such that the first actuator is rotatable on the third hinge point disposed at one side of the stationary frame. A second actuator is coupled to the stationary frame with a fourth hinge point such that the second actuator is rotatable on the fourth hinge point disposed at another side of the stationary frame. The first and second actuators may have operating rods which reciprocate in a length direction thereof, respectively.

Each of the link units may include a first connection link having one end rotatably connected to the stationary frame. A second connection link has one end rotatably connected to another end of the first connection link, and another end of the second connection link is rotatably connected to the first lower welding gun or the second lower welding gun. The first connection link may be rotatably connected to a front end of the operating rod of the first actuator or the second actuator with an extension end which extends from the other end of the first connection link that is rotatably connected to the second connection link to the first actuator or the second actuator.

The one end of the first connection link is rotatably connected to a connection end projecting from or mounted to the outside of the stationary frame through a fifth hinge point. The extension end is connected to the front end of the operating rod of the first or second actuator through a sixth hinge point.

The other end of the second connection link is connected to the first or second lower welding gun through a seventh hinge point, and the one end of the second connection is connected to the first connection link through a link point.

The second connection link may be parallel to the length direction of the upper welding gun when the first or second lower welding tip faces one end of the upper welding gun.

According to another exemplary embodiment of the present inventive concept, a spot welding apparatus may include a stationary frame having a housing formed therein, in which one end of the stationary frame in a length direction thereof is opened. An upper welding gun is mounted to one end of a pressing unit in a length direction of the pressing unit which is disposed in the housing of the stationary frame to have a length direction thereof parallel to the length direction of the stationary frame for reciprocating in the length direction by the pressing unit. A plurality of lower welding guns are mounted to an outside of the stationary frame, in which ends of the plurality of lower welding guns selectively face one end of the upper welding gun in a length direction of the upper welding gun by the plurality of lower welding guns which selectively rotate to accommodate positions of spots to be welded. A plurality of actuators are mounted to the outside of the stationary frame corresponding to the lower welding guns and the actuators rotate the plurality of lower welding guns. The actuators have operating rods rotatably connected to the lower welding guns, respectively.

The pressing unit may include a drive motor provided at one side of the pressing unit in the length direction. A screw shaft is connected to the drive motor to rotate therewith. A movable block is coupled to the screw shaft to reciprocate in a length direction of the screw shaft connected to the upper welding gun.

The lower welding guns are a first lower welding gun including a first swing arm having one end with a first lower welding tip provided thereto. A second lower welding gun includes a second swing arm having one end with a second lower welding tip provided thereto.

The first swing arm may have another end coupled to a first hinge point such that the first swing arm is rotatable on the first hinge point mounted to the stationary frame.

The second swing arm may have another end coupled to a second hinge point such that the second swing arm is rotatable on the second hinge point mounted to the stationary frame.

The first and second swing arms may have shapes and sizes different from each other to accommodate different welding points.

The actuators may have a first actuator coupled to the stationary frame by a third hinge point such that the first actuator is rotatable on the third hinge point disposed at one side of the stationary frame in the length direction thereof, and rotatably coupled to the first swing arm by a first pressing rotation point. A second actuator is coupled to the stationary frame by a fourth hinge point such that the second actuator is rotatable on the fourth hinge point disposed at another side of the stationary frame in the length direction thereof, and rotatably coupled to the second swing arm by a second pressing rotation point.

The operating rods of the first and second actuators may be tilted to face an outside of the upper welding gun.

The spot welding apparatus in accordance with the exemplary embodiment of the present inventive concept has the following advantages. Welding is performed by the lower welding gun selected from the plurality of the lower welding guns to accommodate the different welding points within a limited space and within a short period of time.

The spot welding apparatus in accordance with the exemplary embodiment of the present inventive concept is applicable to different kinds of vehicles regardless of vehicle type and positions and shapes of the welding points, and thus, productivity, flexibility, and efficiency of a vehicle body process can be improved.

Only one spot welding apparatus is used, thus reducing the number of robots provided on a process line and equipment cost.

The reduction of the number of robots further reduces a space occupation ratio, power consumption, and maintenance cost.

BRIEF DESCRIPTION OF THE DRAWINGS

FIG. 3 illustrates a front view of the spot welding apparatus in accordance with the first exemplary embodiment of the present inventive concept.

DETAILED DESCRIPTION OF THE EMBODIMENTS

Figure 1:
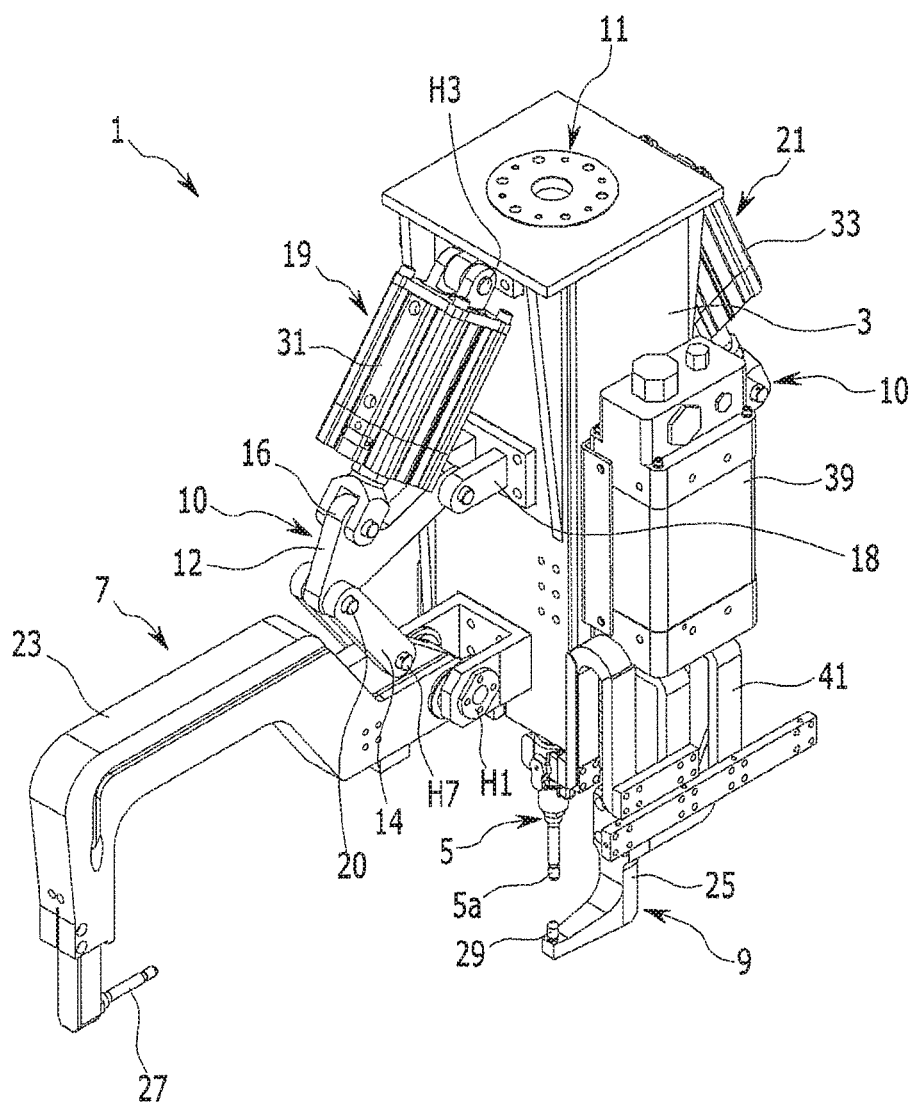

Hereinafter, exemplary embodiments of the present inventive concept will be described in detail with reference to accompanying drawings.

However, since a size and a thickness of each element are shown at will for convenience of description, the present disclosure is not limited to the drawings without fail, but the thickness is enlarged for expressing different parts and regions.

Parts not relevant to description of exemplary embodiments of the present inventive concept are omitted for describing the present disclosure clearly, and throughout the specification, identical or similar elements are given the same reference numerals.

Though terms including ordinal numbers, such as first or second, can be used for describing various elements, the elements are not confined by the terms, and are used only for making one element distinctive from other elements.

The spot welding apparatus in accordance with exemplary embodiments of the present inventive concept has a plurality of lower welding guns for carrying out welding while an upper welding gun presses down one of the lower welding guns automatically selected to accommodate different welding points of a welding object.

Figure 2:
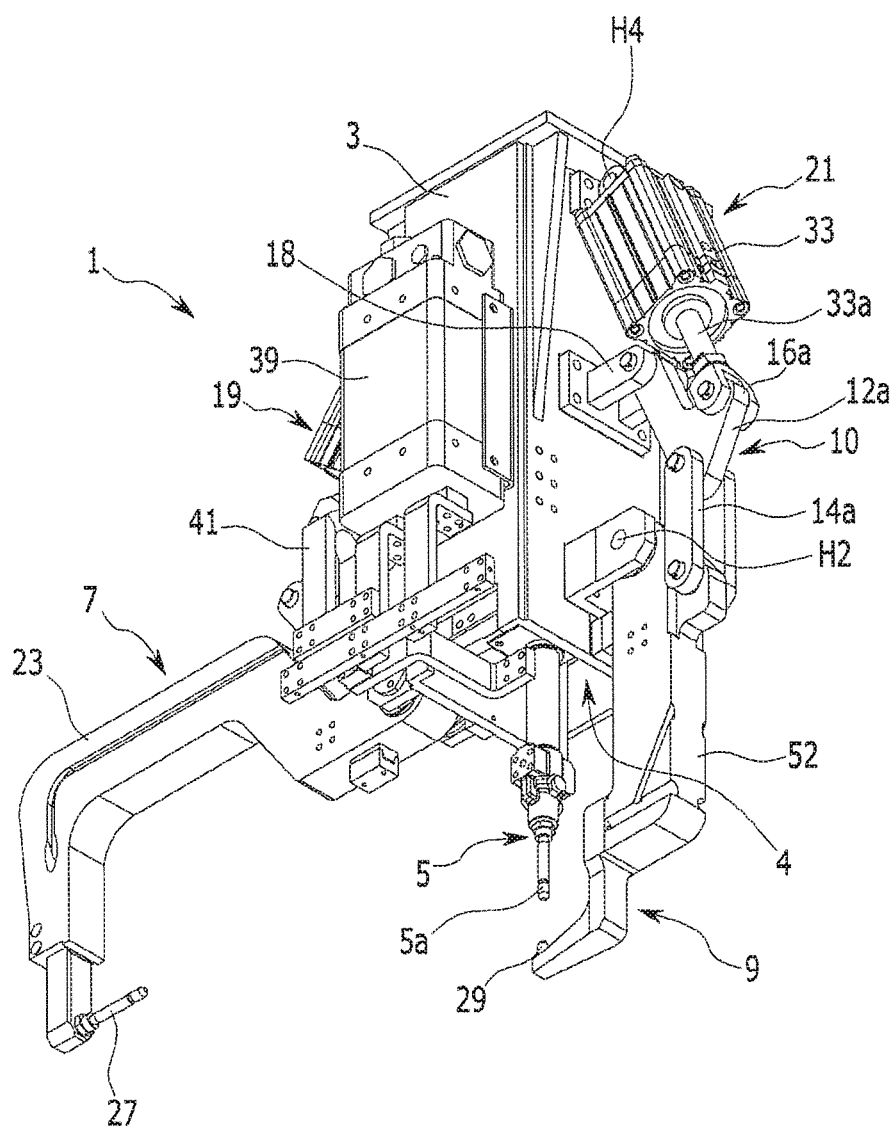
FIG. 2 illustrates a perspective view of the spot welding apparatus in accordance with the exemplary embodiment of the present inventive concept, showing a bottom thereof.
Figure 3:
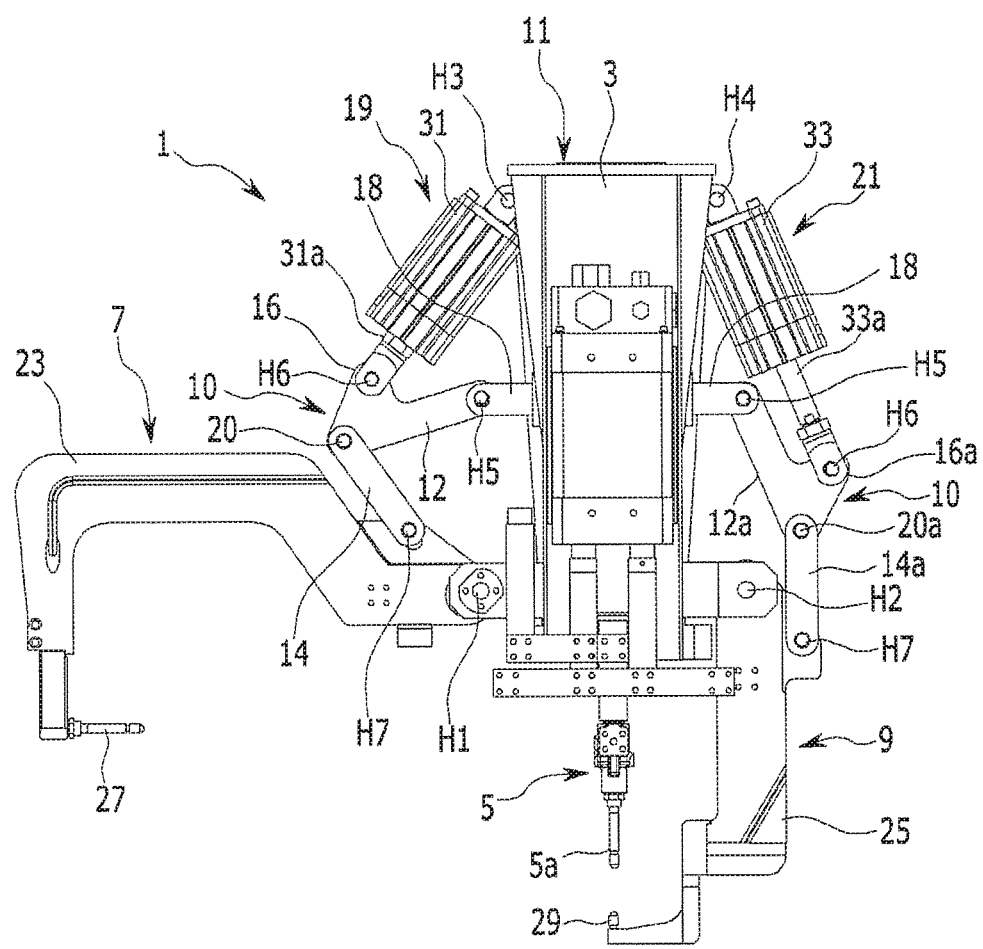
FIG. 3 illustrates a perspective view of a spot welding apparatus in accordance with an exemplary embodiment of the present inventive concept.

FIG. 1 illustrates a perspective view of a spot welding apparatus in accordance with an exemplary embodiment of the present inventive concept, FIG. 2 illustrates a perspective view of a spot welding apparatus in accordance with the exemplary embodiment of the present inventive concept, showing a bottom thereof, and FIG. 3 illustrates a front view of a spot welding apparatus in accordance with the exemplary embodiment of the present inventive concept.

Referring to FIGS. 1 to 3, a spot welding apparatus 1 may include a stationary frame 3, an upper welding gun 5, a plurality of lower welding guns 7 and 9, a plurality of actuators 19 and 21, and a plurality of link units 10.

The stationary frame 3 may have one end with a mounting portion 11 formed thereon to be mounted to a robot or a working table for mounting the stationary frame 3 to the robot or the working table with the mounting portion 11, and another end there of is opened. The stationary frame 3 may further have a housing 4 formed therein.

The upper welding gun 5 is mounted to the stationary frame 3 such that a length direction thereof is parallel to a length direction of the stationary frame 3. The upper welding gun 5 has an upper welding tip 5a provided at a front end thereto for moving in a vertical direction, i.e., reciprocating in the length direction of the upper welding gun 5 by a pressing unit 13 mounted in the stationary frame 3. The upper welding gun 5 is mounted to one end of the length direction of the pressing unit 13 shown in FIG. 4.

Figure 4:
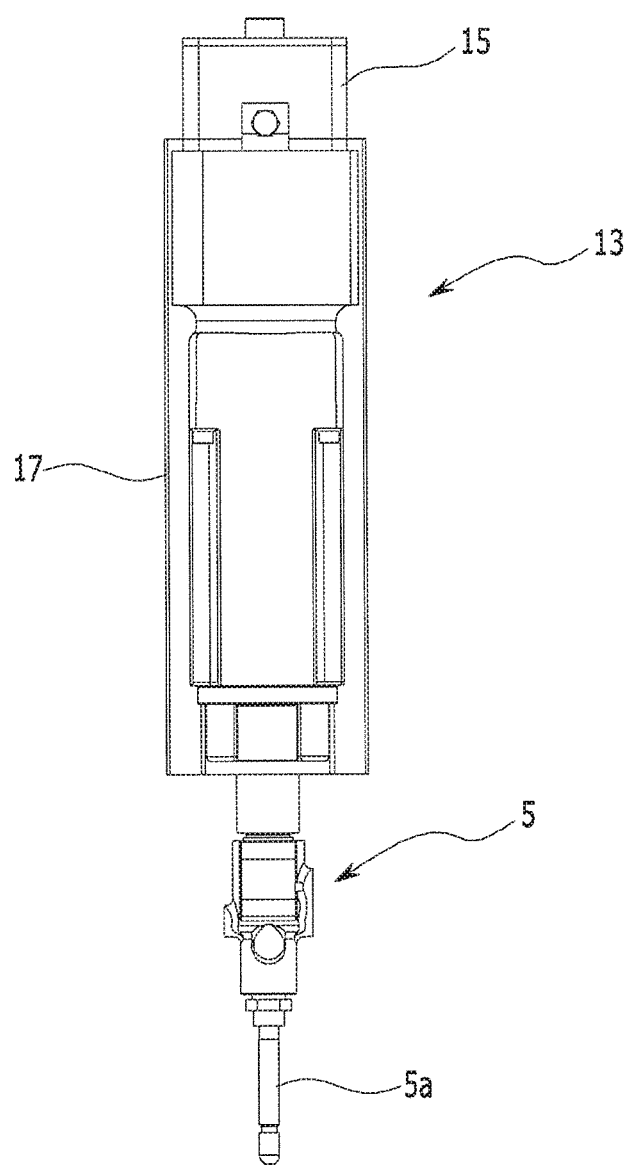
FIG. 4 illustrates a perspective view of a pressing unit applied to the spot welding apparatus in accordance with an exemplary embodiment of the present inventive concept.

FIG. 4 illustrates a perspective view of a pressing unit applied to a spot welding apparatus in accordance with an exemplary embodiment of the present inventive concept.

Referring to FIG. 4, the pressing unit 13 is mounted to the housing formed in the stationary frame 3 such that a length direction of the pressing unit 13 is parallel to the length direction of the stationary frame 3, and has a lower end with the upper welding gun 5 connected to the pressing unit 13.

The pressing unit 13 includes a drive motor 15, a screw shaft 91 and a movable block 93. It should be noted that dashed lines representing the screw shaft 91 and the movable block 93, exemplarily shown in FIG. 4, are merely for illustrational purposes and do not indicate specific shapes, relative shapes, sizes, relative sizes, patterns, materials or other properties of the screw shaft 91 and the movable block 93. Instead, the dashed lines, as exemplarily shown in FIG. 4, merely illustrate the screw shaft 91 and the movable block 93 in a broad and general manner.

The drive motor 15 is provided to one side of the pressing unit 13 in the length direction of the pressing unit 13. In this case, the drive motor 15 may be a step motor of which a rotational speed and a rotating direction are controllable.

The screw shaft is connected to the drive motor 15 to rotate therewith, and the movable block is coupled the screw shaft to move in the length direction of the pressing unit 13, and the movable block is connected to the upper welding gun 5. According to this, the upper welding gun 5 can reciprocate in the length direction of the pressing unit 13.

The drive motor 15, the screw shaft, and the movable block of the pressing unit 13 are mounted in the stationary frame 3 housed in an outside case 17 which is mounted vertically.

The upper welding gun 5 reciprocates vertically as the movable block moves along the screw shaft if the screw shaft rotates according to rotation of the drive motor 15.

Although the pressing unit 13 has the drive motor 15, the screw shaft, and the movable block, the present disclosure does not limit the pressing unit 13 to this, but the pressing unit 13 may have any one of cylinders selected from a pneumatic cylinder and a hydraulic cylinder which are used widely. In this case, the upper welding gun 5 may reciprocate with an operating rod which can reciprocate in a length direction.

The lower welding gun 7 or 9 may be mounted to an outside of the stationary frame 3 to be rotatable to accommodate different welding points, such that one end of the lower welding gun 7 or 9 faces one end of the upper welding gun 5 in a length direction.

That is, the one end of the lower welding gun 7 or 9 may face the one end of the upper welding gun 5 in the length direction as a swing arm 23 or 25 rotates to selectively corresponding to the welding points of a welding object according to operation of the actuator 19 or 21.

Hereafter, the lower welding gun 7 or 9 will be described in more detail.

The lower welding guns 7 and 9 include first and second lower welding guns 7 and 9. The first and second lower welding guns 7 and 9 include first and second swing arms 23 and 25 which are rotatable according to operation of the actuators 19 and 21, respectively.

The first and second lower welding guns 7 and 9 are mounted to the stationary frame 3 and are rotatable by the first and second swing arms 23 and 25, respectively.

In this case, the first and second swing arms 23 and 25 may be provided to left and right outsides of the upper welding gun 5 respectively, with ends thereof coupled to first and second hinge points H1 and H2 of the stationary frame 3 respectively such that the first and second swing arms 23 and 25 are rotatable on the first and second hinge points H1 and H2 mounted to the stationary frame 3, respectively.

Other ends of the first and second swing arms 23 and 25 have the first and second lower welding tips 27 and 29 respectively provided thereto.

In this case, the first and second swing arms 23 and 25 may have shapes and sizes different from each other for matching to different welding points of the welding object.

The first and second lower welding guns 7 and 9 are rotatable by rotating the first and second swing arms 23 and 25 with the actuators 19 and 21 respectively for accommodating the welding points of the welding object.

If the first and second lower welding guns 7 and 9 are used, fast welding can be made by using the spot welding apparatus 1, and the welding can be carried out for different vehicles regardless of vehicle type, positions, and shapes of the welding points. For example, in a case of the exemplary embodiment in FIG. 3, two welding points on the same line blocked with a partition wall disposed between the two welding points may be welded with one spot welding apparatus 1. After welding one of the welding points by using the second lower welding gun 9, the other welding point across the partition wall may be welded by using the first lower welding gun 7 in succession without changing the spot welding apparatus. (See FIGS. 5 to 8)

The actuators 19 and 21 which respectively rotate the first and second swing arms 23 and 25 of the first and second lower welding guns 7 and 9 have the first and second actuators 19 and 21, respectively.

The first and second actuators 19 and 21 may have cylinders 31 and 33 which may be pneumatic or hydraulic cylinders, and are hereinafter called first and second cylinders 31 and 33. The first and second actuators 19 and 21 may have operating rods movable in a length direction thereof, respectively.

Referring to FIG. 3, the first actuator 19 is coupled to the stationary frame 3 with a third hinge point H3 such that the first cylinder 31 is rotatable on the third hinge point H3 positioned on an upper side of the stationary frame 3, and a front end of the operating rod 31a is connected to the first swing arm 23 with the link units 10.

The second actuator 21 is coupled to the stationary frame 3 with a fourth hinge point H4 such that the second cylinder 33 is rotatable on the fourth hinge point H4 positioned on another upper side of the stationary frame 3, and a front end of the operating rod 33a is connected to the second swing arm 25 with the link units 10.

In this case, the first and second actuator 19 and 21 may be mounted to be tilted such that the front ends of the operating rods 31a and 33a face an outside of the upper welding gun 5.

The link units 10 are respectively mounted between the first and second actuators 19 and 21. The first and second swing arms 23 and 25 are connected to the stationary frame 3, and ends thereof are rotatably coupled to the stationary frame 3 (for an example, H5 in FIG. 3) for rotating according to operation of the first and second actuators 19 and 21, respectively.

The link units 10 may include first connection links 12 and 12a having ends thereof rotatably connected to the stationary frame 3. Second connection links 14 and 14a have ends thereof rotatably connected to other ends of the first connection links 12 and 12a and other ends of the second connection links 14 and 14a are rotatably connected to the lower welding guns 7 and 9, respectively.

The first connection links 12 and 12a may be rotatably connected to front ends of the operating rods 31a and 33a of the first and second actuators 19 and 21 with extension ends 16 and 16a. The extension ends 16 and 16a extend from other ends of the first connection links 12 and 12a that are rotatably connected to the second connection links 14 and 14a toward the first and second actuators 19 and 21, respectively.

That is, the one ends of the first connection links 12 and 12a are rotatably connected to connection ends 18 projected from or mounted to an outside of the stationary frame 3 with fifth hinge points H5 respectively. The extension ends 16 and 16a may be connected to the front ends of the operating rods 31a and 33a of the first and second actuators 19 and 21 with sixth hinge points H6, respectively.

The second connection links 14 and 14a have the other ends connected to the first and the second swing arms 23 and 25 of the lower welding guns 7 and 9 with seventh hinge points H7, respectively, and the one ends connected to the first connection links 12 and 12a with link points 20 and 20a, respectively.

Figure 5:
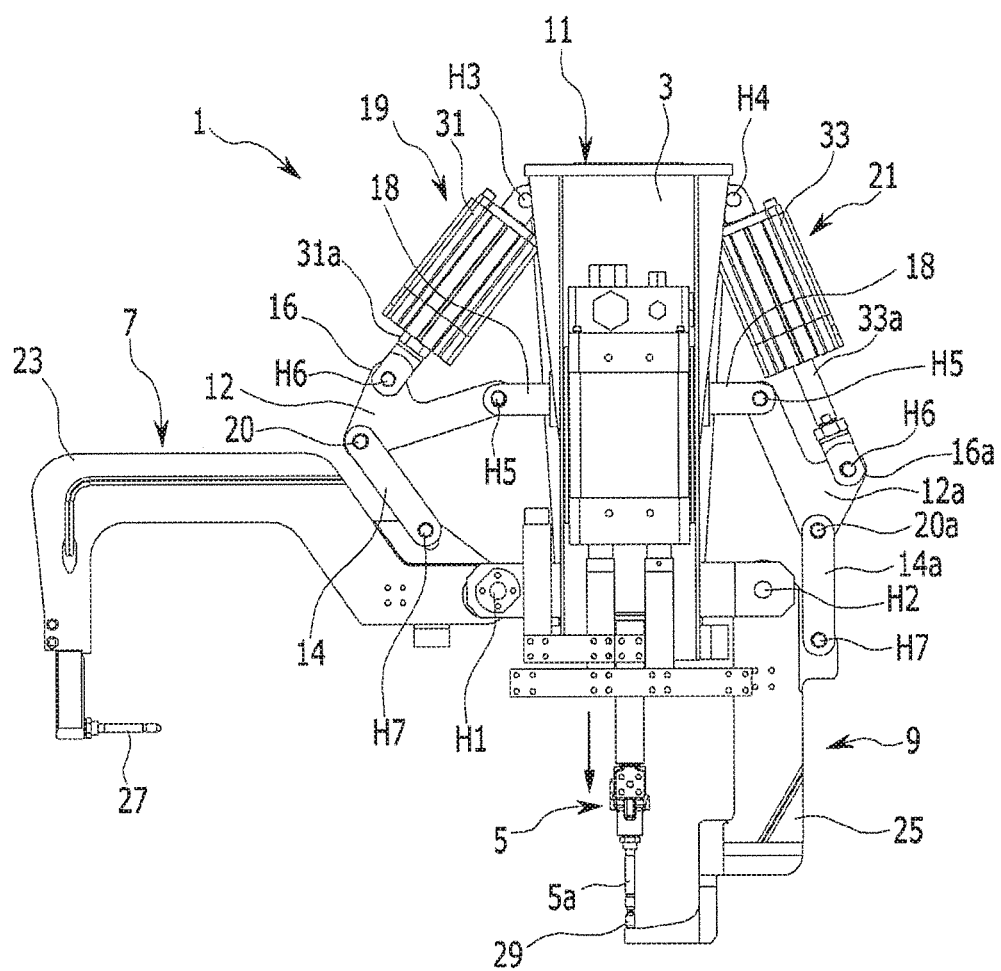
FIGS. 5 to 8 illustrate operation of the spot welding apparatus in accordance with the exemplary embodiment of the present inventive concept.
Figure 8:
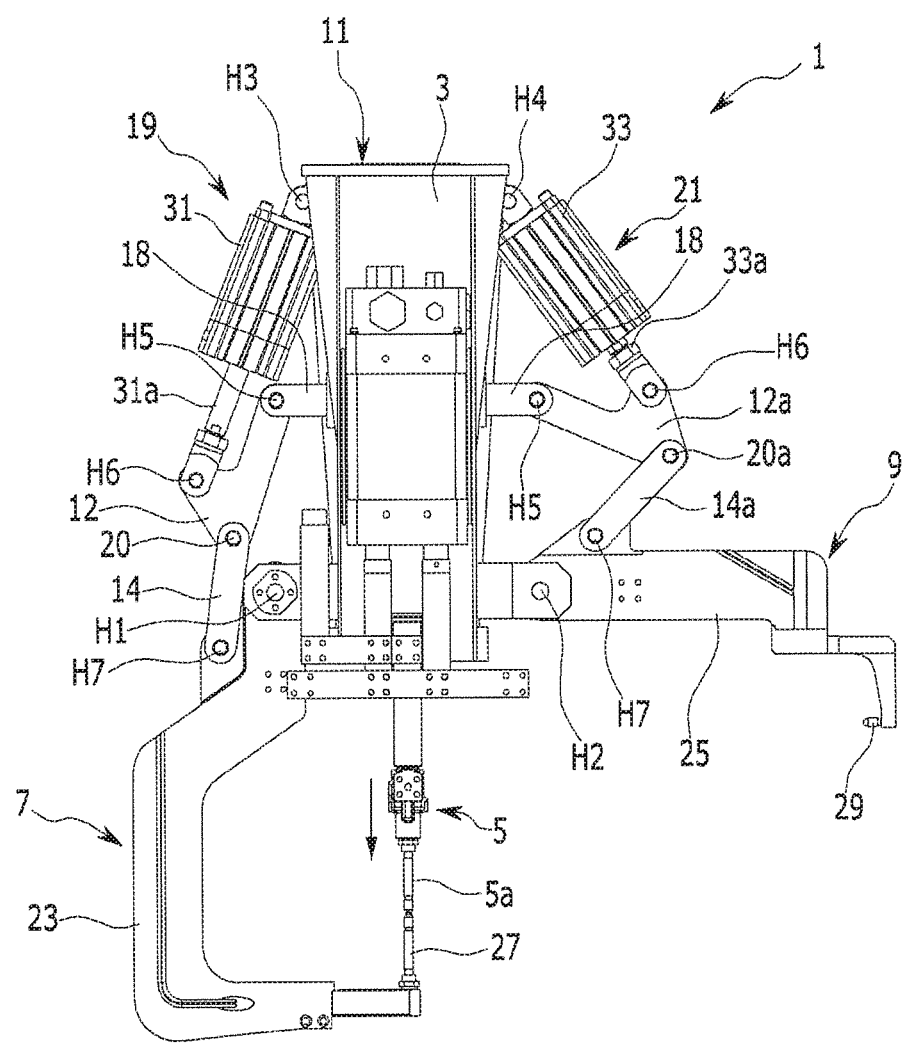

In this case, the second connection links 14 and 14a may be in a state in which the second connection links 14 and 14a are parallel to the length direction of the upper welding gun 5 when the first or second lower welding tip 27 or 29 face one end of the upper welding gun 5 as shown in FIGS. 5 and 8.

Accordingly, misalignment of the first or the second lower welding gun 7 or 9 with the upper welding gun 5 can be prevented when the upper welding gun 5 selectively presses down the first or the second lower welding gun 7 or 9.

Although a case of the spot welding apparatus of the present disclosure has been described in which the lower welding gun has two welding guns of the first and second lower welding guns 7 and 9, the spot welding apparatus is not limited to this, but may have more than two lower welding guns if required, and the actuators 19, 21 and link units 10 may also be mounted matched to the number of the lower welding guns.

Hereafter, an operation of the spot welding apparatus 1 will be described, with reference to FIGS. 5 to 8.

FIGS. 5 to 8 illustrate an operation of a spot welding apparatus in accordance with an exemplary embodiment of the present inventive concept.

Referring to FIG. 5, welding is performed as a welding object enters between the upper welding tip 5a of the upper welding gun 5 and the second lower welding tip 29 of the second lower welding gun 9. The upper welding gun 5 presses down the welding point of the welding object by the pressing unit 13.

Figure 6:
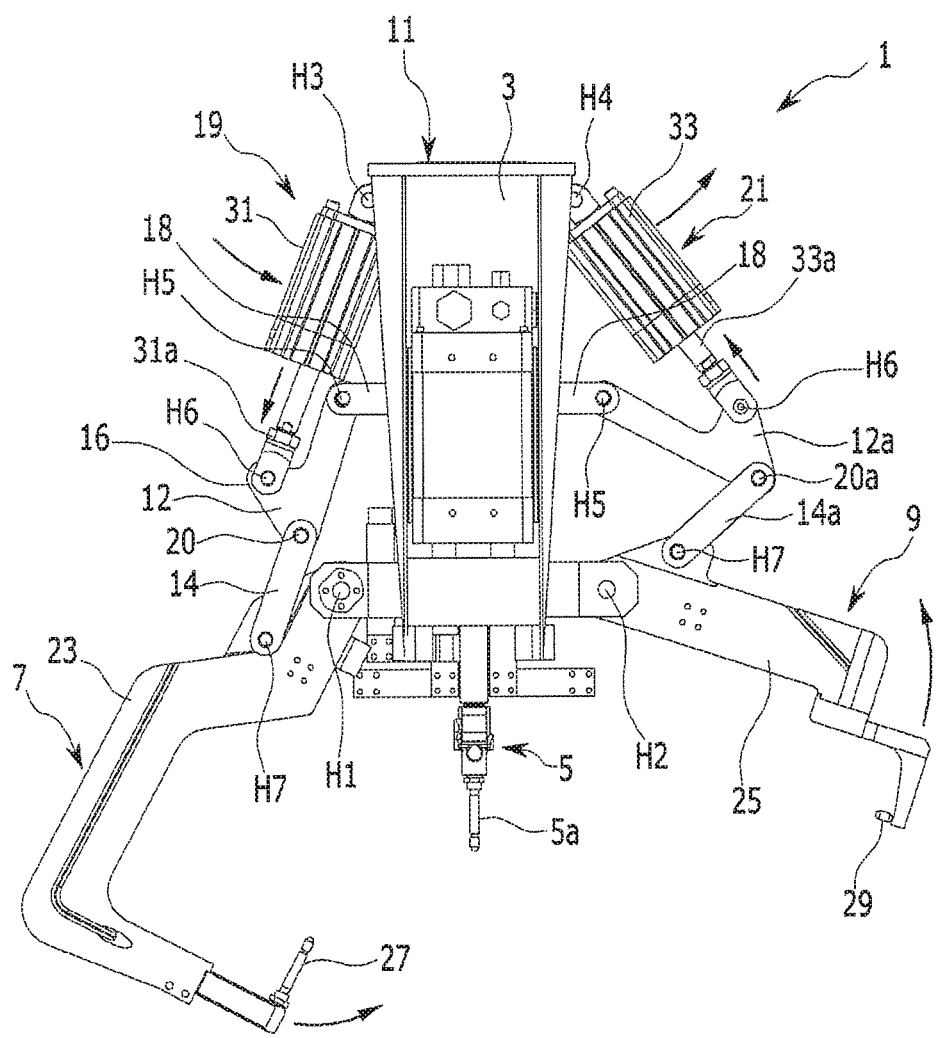

Referring to FIG. 6, when other welding points on the same line need to be welded, having different shapes and positions, the second lower welding gun 9 rotates to a right side outwardly from the upper welding gun 5.

In this case, as the operating rod 33a of the second actuator 21 moves backward, the second lower welding gun 9 rotates, indicated by an arrow in FIG. 6.

That is, as the operating rod 33a, which moves backward, pulls a sixth hinge point H6, the first connection link 12a is pulled upward. In this case, the first connection link 12a rotates on a fifth hinge point H5.

Then, as one end of the second connection link 14a rotates on a seventh hinge point H7 together with the first connection link 12a, and another end of the second connection link 14a rotates on the link point 20a connected to the first connection link 12a, the second swing arm 25 rotates on the second hinge point H2 outwardly from the upper welding gun 5.

In this case, the second actuator 21 rotates on the fourth hinge point H4 connected to the stationary frame 3 outwardly as indicated by an arrow in FIG. 6 to smoothly rotate a link unit 10.

Figure 7:
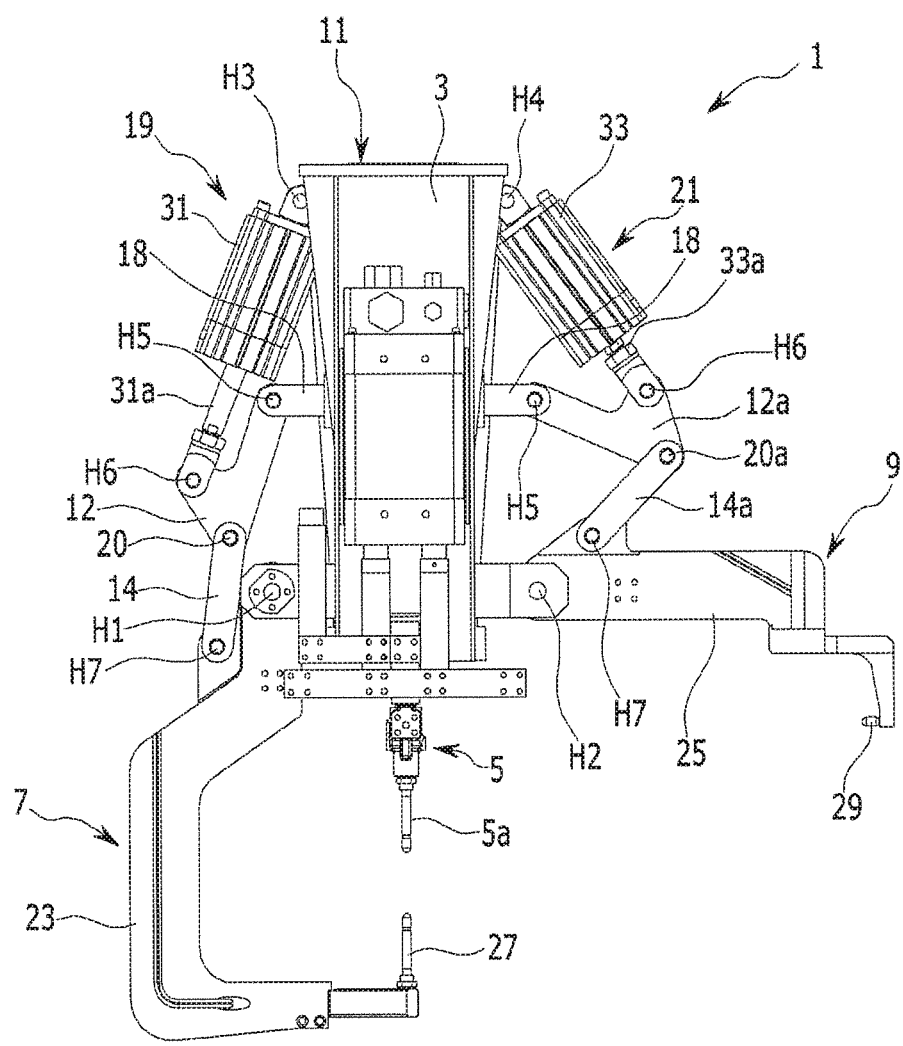

As shown in FIG. 7, the second lower welding gun 9 may rotate outwardly from the upper welding gun 5. In this case a rotation angle thereof may be at 90° from a vertical extension line from the upper welding gun 5. With this, interference between the first and second lower welding guns 7 and 9 may be prevented in the welding.

Referring to FIG. 6, when the second lower welding gun 9 rotates as indicated by an arrow, the first lower welding gun 7 may simultaneously rotate toward the upper welding gun 5 to be matched to the upper welding gun 5.

In this case, the first lower welding gun 7 rotates as the operating rod 31a of the first actuator 19 moves forward.

That is, as the operating rod 31a, which moves forward, pushes the sixth hinge point H6 away, the first connection link 12 is pushed down. In this case, the first connection link 12 rotates on the fifth hinge point H5.

Then, as one end of the second connection link 14 rotates on the seventh hinge point H7 together with the first connection link 12, and the other end of the second connection link 14 rotates on the link point 20 connected to the first connection link 12, the first swing arm 23 rotates on the first hinge point H1 toward the upper welding gun 5.

In this case, in order to smoothly rotate the link unit 10, the first actuator 19 rotates on the third hinge point H3 connected to the stationary frame 3 toward the stationary frame 3 as indicated by the arrow.

Accordingly, as the first lower welding gun 7 rotates toward the upper welding gun 5, the first lower welding tip 27 may face one end of the upper welding gun 5 in the length direction.

The welding object enters between the upper welding gun 5 and the first lower welding gun 7 referring to FIG. 8, and the upper welding gun 5 presses down the welding point of the welding object entered with the pressing unit 13 to perform the welding.

The spot welding apparatus 1 in accordance with the exemplary embodiment of the present inventive concept may carry out welding for different welding points of the welding object with the first or second lower welding gun 7, 9.

According to this, fast welding can be carried out with a short period of time in a limited space, the welding can be applicable to different kinds of vehicles in common regardless of vehicle type, and positions, and shapes of the welding points, and productivity, flexibility, and efficiency of a vehicle manufacturing process can be improved.

By applying the spot welding apparatus 1, the number of robots provided on a process line can be reduced, and equipment cost can be saved.

Further, as the number of robots provided on the process line is reduced, a space occupation ratio of the robots provided on the process line, energy consumption, and repair and maintenance cost can be reduced.

Figure 9:
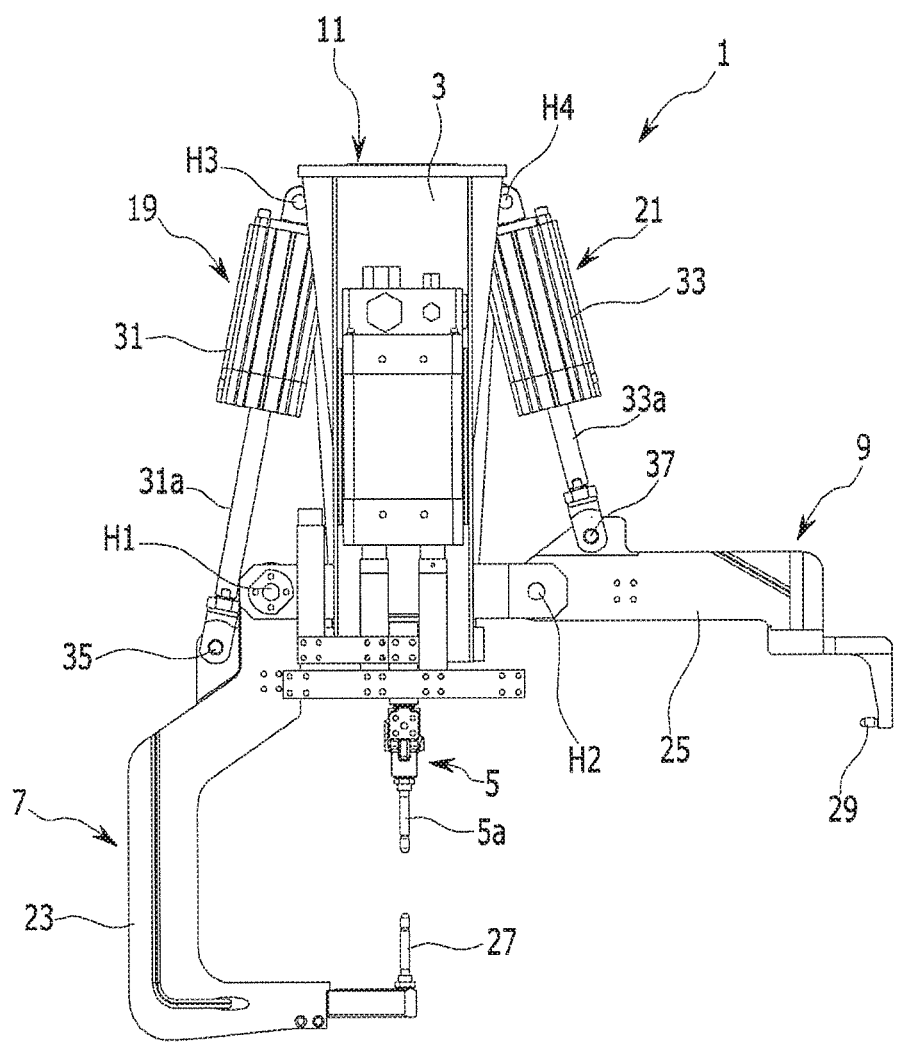
FIG. 9 illustrates a front view of a spot welding apparatus in accordance with another exemplary embodiment of the present inventive concept.

FIG. 9 illustrates a front view of a spot welding apparatus in accordance with another exemplary embodiment of the present inventive concept.

Referring to FIG. 9, the spot welding apparatus 1 has the same configuration and operation with the spot welding apparatus 1 in accordance with the exemplary embodiment of the present inventive concept.

However, the spot welding apparatus 1 in accordance with the exemplary embodiment of the present inventive concept has the link units 10 mounted between the actuators 19 and 21 and the lower welding guns 7 and 9, respectively, such that the operating rods 31a and 33a of the actuators 19 and 21 rotate the lower welding guns 7 and 9 through the link units 10, respectively.

On the other hand, according to the spot welding apparatus 1 in accordance with another exemplary embodiment of the present inventive concept, the operating rods 31a and 33a of the actuators 19 and 21 are directly connected to the first and second lower welding guns 7 and 9, respectively, for rotating the first and second lower welding guns 7 and 9.

The spot welding apparatus 1 in accordance with another exemplary embodiment of the present inventive concept may have the operating rod 31a of the first actuator 19 rotatably connected to the first swing arm 23 of the first lower welding gun 7 through a first pressing rotation point 35. The operating rod 33a of the second actuator 21 may be rotatably connected to the second swing arm 25 of the second lower welding gun 9 through a second pressing rotation point 37.

In this case, the first and second actuators 19 and 21 may be mounted to be tilted, such that front ends of the operating rods 31a and 33a face an outside of the upper welding gun 5.

The operation of the spot welding apparatus 1 in accordance with another exemplary embodiment of the present inventive concept will be further described with reference to FIGS. 10 and 11.

Figure 10:
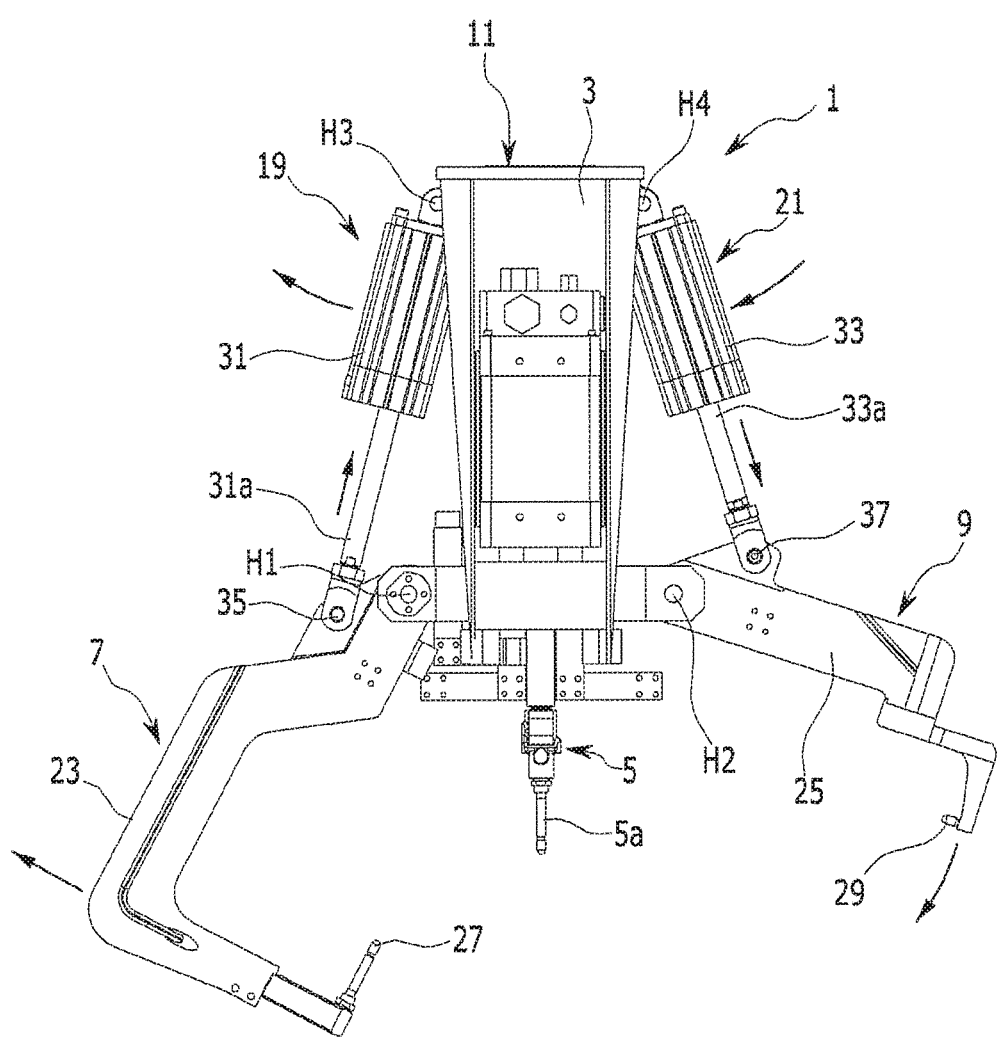
FIGS. 10 and 11 illustrate operation of the spot welding apparatus in accordance with another exemplary embodiment of the present inventive concept.
Figure 11:
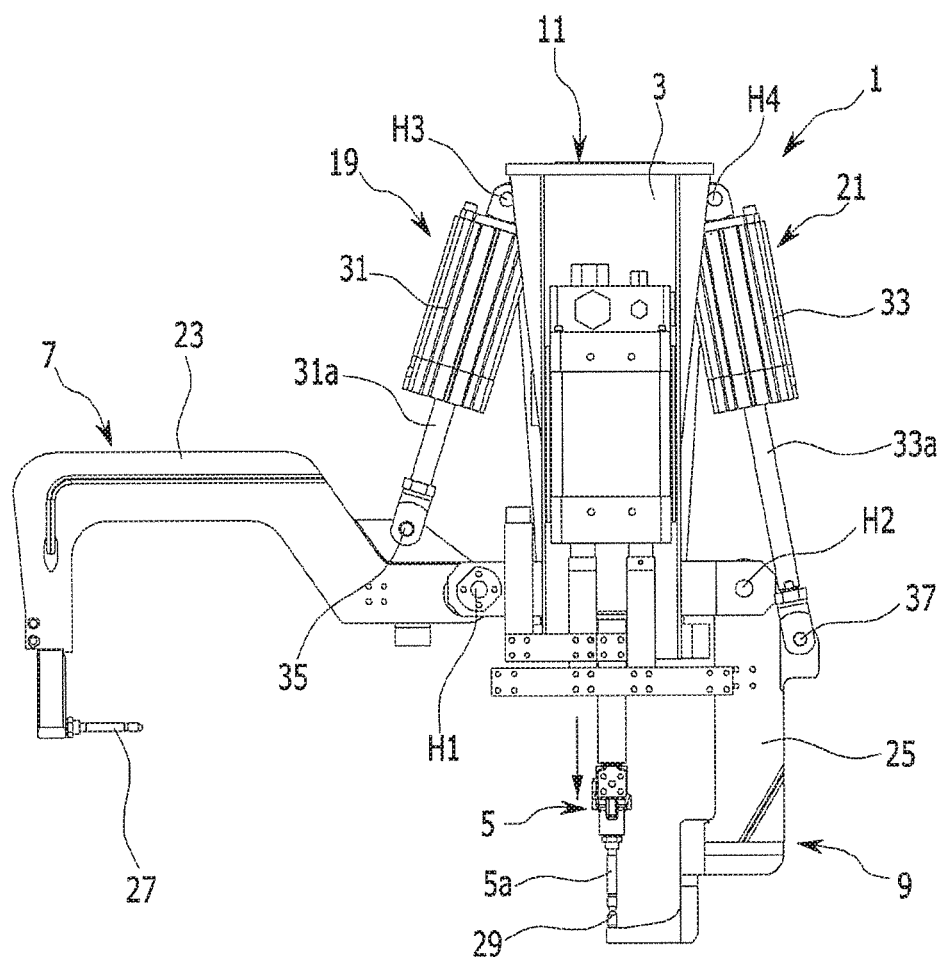

FIGS. 10 and 11 illustrate operation of a spot welding apparatus in accordance with another exemplary embodiment of the present inventive concept.

Referring to FIG. 10, when another welding point of the welding object having a different shape and position is welded, the first lower welding gun 7 rotates outwardly from the upper welding gun 5.

In this case the first lower welding gun 7 rotates as the operating rod 31a of the first actuator 19 moves backward (arrow mark).

That is, the operating rod 31a, which moves backward, pulls the first pressing rotation point 35 to pull the first swing arm 23. In this case, the first swing arm 23 rotates on the first hinge point H1 outwardly from the upper welding gun 5.

For the operating rod 31a smoothly to rotate the first swing arm 23 by the backward movement of the operating rod 31a, the first actuator 19 rotates on the third hinge point H3, which is connected to the stationary frame 3, outwardly from the stationary frame 3.

When the first lower welding gun 7 rotates, the second lower welding gun 9 may simultaneously rotate toward the upper welding gun 5 to face the upper welding gun 5. In this case, the second lower welding gun 9 rotates as the operating rod 33a of the second actuator 21 moves forward, indicated by an arrow.

That is, the operating rod 33a, which moves forward, pushes the second pressing rotation point 37 to push the second swing arm 25 downward. In this case, the second swing arm 25 rotates on the second hinge point H2 toward the upper welding gun 5.

For the operating rod 33a to smoothly rotate the second swing arm 25 by the forward movement of the operating rod 33a, the second actuator 21 rotates on the fourth hinge point H4, which is connected to the stationary frame 3, toward the stationary frame 3.

Accordingly, as shown in FIG. 11, the second lower welding gun 9 may face the upper welding gun 5 as the second lower welding gun 9 rotates toward the upper welding gun 5, and the first lower welding gun 7 may rotate at 90° outwardly from the length direction of the upper welding gun 5.

The welding object enters between the upper welding gun 5 and the second lower welding gun 9, and the upper welding gun 5 presses down the welding point of the welding object entered with the pressing unit 13 to weld.

The spot welding apparatus 1 in accordance with another exemplary embodiment of the present inventive concept may carry out welding for different welding points of the welding object with the first or second lower welding guns 7, 9.

A reference number "39" on the drawing denotes a transformer, and "41" denotes a bus bar, and since the transformer 39 and the bus bar 41 are known to persons skilled in this field of art, detailed description thereof is omitted.

Although the exemplary embodiments of the present inventive concept have been described, the present disclosure is not limited to the exemplary embodiments, but includes all range of changes made by a person skilled in this field of art from the exemplary embodiments of the present inventive concept and recognized equivalent to the exemplary embodiments.

While this disclosure has been described in connection with what is presently considered to be practical exemplary embodiments, it is to be understood that the present disclosure is not limited to the disclosed embodiments, but on the contrary, is intended to cover various modifications and equivalent arrangements included within the spirit and scope of the appended claims.

What is claimed is:

1. A spot welding apparatus comprising:
    a stationary frame having a housing formed therein, in which one end of the stationary frame in a length direction of the stationary frame is opened;
    an upper welding gun mounted to one end of a pressing unit in a length direction of the pressing unit which is provided in the housing of the stationary frame;
    a plurality of lower welding guns mounted on an outside of the stationary frame, in which ends of the plurality of lower welding guns selectively face one end of the upper welding gun in a length direction of the upper welding gun by the plurality of lower welding guns which selectively rotate to accommodate positions of spots to be welded; and
    a plurality of actuators mounted to the outside of the stationary frame corresponding to the plurality of lower welding guns, the actuators rotating the plurality of lower welding guns, respectively,
    wherein the plurality of actuators have operating rods rotatably connected to the plurality of lower welding guns, respectively, and
    wherein the length direction of the upper welding gun is parallel to the length direction of the stationary frame, and the upper welding gun moves back and forth in the length direction of the stationary frame by the pressing unit.

2. The spot welding apparatus of claim 1, wherein the pressing unit includes:
    a drive motor provided at one side of the pressing unit in the length direction thereof;
    a screw shaft connected to the drive motor to rotate therewith; and
    a movable block coupled to the screw shaft to reciprocate in a length direction of the screw shaft and connected to the upper welding gun.

3. The spot welding apparatus of claim 1, wherein the plurality of lower welding guns comprises:
    a first lower welding gun including a first swing arm provided at one end thereof with a first lower welding tip; and
    a second lower welding gun including a second swing arm provided at one end thereof with a second lower welding tip.

4. The spot welding apparatus of claim 3 wherein the first swing arm has another end coupled to a first hinge point such that the first swing arm is rotatable on the first hinge point mounted to the stationary frame.

5. The spot welding apparatus of claim 3 wherein the second swing arm has another end coupled to a second hinge point such that the second swing arm is rotatable on the second hinge point mounted to the stationary frame.

6. The spot welding apparatus of claim 3 wherein the first and second swing arms have shapes and sizes different from each other to accommodate different spots to be welded.

7. The spot welding apparatus of claim 3 wherein the plurality of actuators comprises
    a first actuator coupled to the stationary frame by a third hinge point such that the first actuator is rotatable on the third hinge point disposed at one side of the stationary frame in the length direction thereof, and rotatably coupled to the first swing arm by a first pressing rotation point; and
    a second actuator coupled to the stationary frame by a fourth hinge point such that the second actuator is rotatable on the fourth hinge point disposed at another side of the stationary frame in the length direction thereof, and rotatably coupled to the second swing arm by a second pressing rotation point.

8. The spot welding apparatus of claim 7 wherein front ends of the operating rods of the first and second actuators are tilted to face an outside of the upper welding gun.

* * * * *